US007864707B2

(12) United States Patent
Dimitropoulos et al.

(10) Patent No.: US 7,864,707 B2
(45) Date of Patent: Jan. 4, 2011

(54) DETERMINATION OF NETWORK TOPOLOGY USING FLOW-BASED TRAFFIC INFORMATION

(75) Inventors: Xenofontas Dimitropoulos, Zurich (CH); Andreas Kind, Kilchberg (CH); Bernhard Jansen, Rueschlikon (CH); Jeroen Massar, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 12/391,556

(22) Filed: Feb. 24, 2009

(65) Prior Publication Data

US 2010/0214947 A1 Aug. 26, 2010

(51) Int. Cl.
*H04L 12/28* (2006.01)
(52) U.S. Cl. ..................................... 370/254
(58) Field of Classification Search ........................ None
See application file for complete search history.

(56) References Cited

U.S. PATENT DOCUMENTS

| 6,411,957 B1 * | 6/2002 | Dijkstra ...................... 707/752 |
| 2006/0029002 A1 * | 2/2006 | Park et al. ................... 370/254 |
| 2009/0161578 A1 * | 6/2009 | Yeung et al. ................. 370/254 |

OTHER PUBLICATIONS

Cisco IOS Netflow, [online]; [retrieved on Dec. 30, 2008]; retrieved from the Internet http://www.cisco.com/en/US/products/ps6601/products_ios_protocol_group_home.html.
IP Flow Information Export (IPFIX), [online]; [retrieved on Dec. 30, 2008]; retrieved from the Internet http://www.ietf.org/html.charters/ipfix-charter.html.

* cited by examiner

*Primary Examiner*—Chirag G Shah
*Assistant Examiner*—Salvador E Rivas
(74) *Attorney, Agent, or Firm*—Cantor Colburn LLP; Stephen Kaufman (57) ABSTRACT

A method for determination of a network topology includes generating a list of device sets for a destination; removing any duplicate device sets from the list; creating a tree for the destination by introducing a root node into the tree; sorting the list of device sets for the destination by length; removing the shortest device set from the list; introducing a new node representing the shortest device set into the tree; determining whether a node in the tree represents a maximum length subset of the shortest device set, and in the event that a node is determined, connecting the new node to the determined node, or else connecting the new node to the root node; setting the identifier of the introduced node to a list of members of the shortest device set that are not included in the maximum length subset of the determined node.

20 Claims, 8 Drawing Sheets

```
FOR EACH DESTINATION, GENERATE A LIST OF DEVICE SETS
201
```

```
REMOVE DUPLICATE DEVICE SETS
202
```

```
CREATE TREE FOR EACH DESTINATION
203
```

```
MERGE TREES CREATED IN BLOCK 203
204
```

INTRODUCE ROOT NODE FOR DESTINATION
301

SORT LIST OF DEVICE SETS FOR DESTINATION BY LENGTH
302

REMOVE SHORTEST DEVICE SET FROM LIST
303

INTRODUCE NEW NODE REPRESENTING SHORTEST DEVICE SET INTO TREE
304

DETERMINE IF ANY NODE IN TREE REPRESENTS A MAXIMUM LENGTH SUBSET OF SHORTEST DEVICE SET
305

CONNECT NEW NODE TO LAST NODE IDENTIFIED IN BLOCK 305;
IF NO NODES IDENTIFIED IN BLOCK 305, CONNECT NEW NODE TO ROOT NODE
306

SET IDENTIFIER OF NEW NODE TO THE MEMBERS OF THE SHORTEST DEVICE SET THAT ARE NOT IN THE MAXIMUM LENGTH SUBSET OF THE IDENTIFIED NODE OF BLOCK 305; OR, IF NO NODE IDENTIFIED IN BLOCK 305, SET IDENTIFIER OF NEW NODE TO MEMBERS OF SHORTEST DEVICE SET
307

REPEAT BLOCKS 303-307 UNTIL NO MORE DEVICE SETS FOR DESTINATION
308

BUILD A DIRECTED GRAPH (S->R, R->D) FROM A SOURCE-DESTINATION OBSERVATION TAKEN AT A NETWORK DEVICE
701

ADD THE DIRECTED GRAPH FROM BLOCK 701 TO THE SET OF ALL POSSIBLE GRAPHS
702

BUILD A DIRECTED GRAPH (S->R, R->D) FROM A NEXT SOURCE-DESTINATION OBSERVATION TAKEN AT THE NETWORK DEVICE
703

REPEAT BLOCK 703 FOR ALL SOURCE-DESTINATION OBSERVATIONS AVAILABLE FROM THE NETWORK DEVICE
704

ADD ALL NON-CONFLICTING DIRECTED GRAPHS BUILT IN BLOCKS 703-704 TO THE SET OF ALL POSSIBLE GRAPHS
705

RETURN THE SET OF ALL POSSIBLE GRAPHS AS THE TOPOLOGY TREE FOR THE NETWORK DEVICE
706

DETERMINATION OF NETWORK TOPOLOGY USING FLOW-BASED TRAFFIC INFORMATION

BACKGROUND

This disclosure relates generally to the field of network topology determination.

Computer networks are complex systems that may be difficult to manage and operate. The deployed topology layout and routing regimes may not be fully understood. A network administrator may examine the network configuration at network nodes, such as routers or switches; however, verification of the deployed configuration is not easy, as a network administrator may not necessarily have access to the network configuration information needed to fully understand the topology layout and routing regime.

Sniffing of Open Shortest Path First/Border Gateway Protocol (OSPF/BGP) routing information is one solution that may be used to determine network topology. A drawback of this approach is that sniffing is costly, laborious, and may require special permissions. Another solution is accessing configurations via Simple Network Management Protocol (SNMP), however, credentials may be required, and routers must be known.

There exists a need in the art for a method for determination of network topology using traffic records comprising flow-based traffic information.

SUMMARY

An exemplary embodiment of a method for determination of a network topology from a set of traffic records includes: generating a list of device sets for a destination from the set of traffic records, each device set comprising at least one network device; removing any duplicate device sets from the list of device sets; creating a tree for the destination using the list of device sets, wherein creating a tree comprises: introducing a root node into the tree; sorting the list of device sets for the destination by length; removing the shortest device set from the list; introducing a new node representing the shortest device set into the tree; determining whether a node in the tree represents a maximum length subset of the shortest path, and in the event that a node is determined, connecting the new node to the determined node, or else connecting the new node to the root node; setting the identifier of the introduced node to a list of members of the shortest device set that are not represented in the determined node, or, in the event that the new node is connected to the root node, to a list of members of the shortest device set; and repeating the removing the shortest device set, introducing, determining, and setting for the next shortest device set in the list, until there are no more device sets remaining for the destination.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a method for determination of network topology using flow-based traffic information are provided, with exemplary embodiments being discussed below in detail. Information records obtained from an end-to-end flow-based traffic measurement utility such as, for example, Cisco's NetFlow, or Internet Engineering Task Force's IP Flow Information Export (IPFIX) (http://www.ietforg/html-.charters/ipfix-charter.html), may be used. Traffic flow information records in the form of source-destination pairs (s→d pairs) observed at various locations are exported at network routers and switches; these source-destination pairs are processed to determine topology. Directed topology graphs may be generated using s→d pairs if the assumption of shortest-path destination routing (meaning that a selected route depends only on the destination) with static routes is not violated during the observation time interval that the s→d pairs are collected.

Key fields from the traffic records may include source address, destination address, inbound interface, interface information, identification of a measurement point (i.e., router address and id), timing information, and actual loads of paths. The source-destination pairs observed at a network device, including but not limited to routers, switches, or other types of network nodes, may be analyzed against hypothetical topologies and routing paths between various network devices. The number of possible paths may be reduced when source-destination pairs are observed at multiple measurement points and a shortest-path destination routing regime with static routes is assumed. Additional constraints for reducing possible paths may be based on the timing information of the flow observations, the inbound/outbound interface information, or the actual load of the paths.

Figure 1:
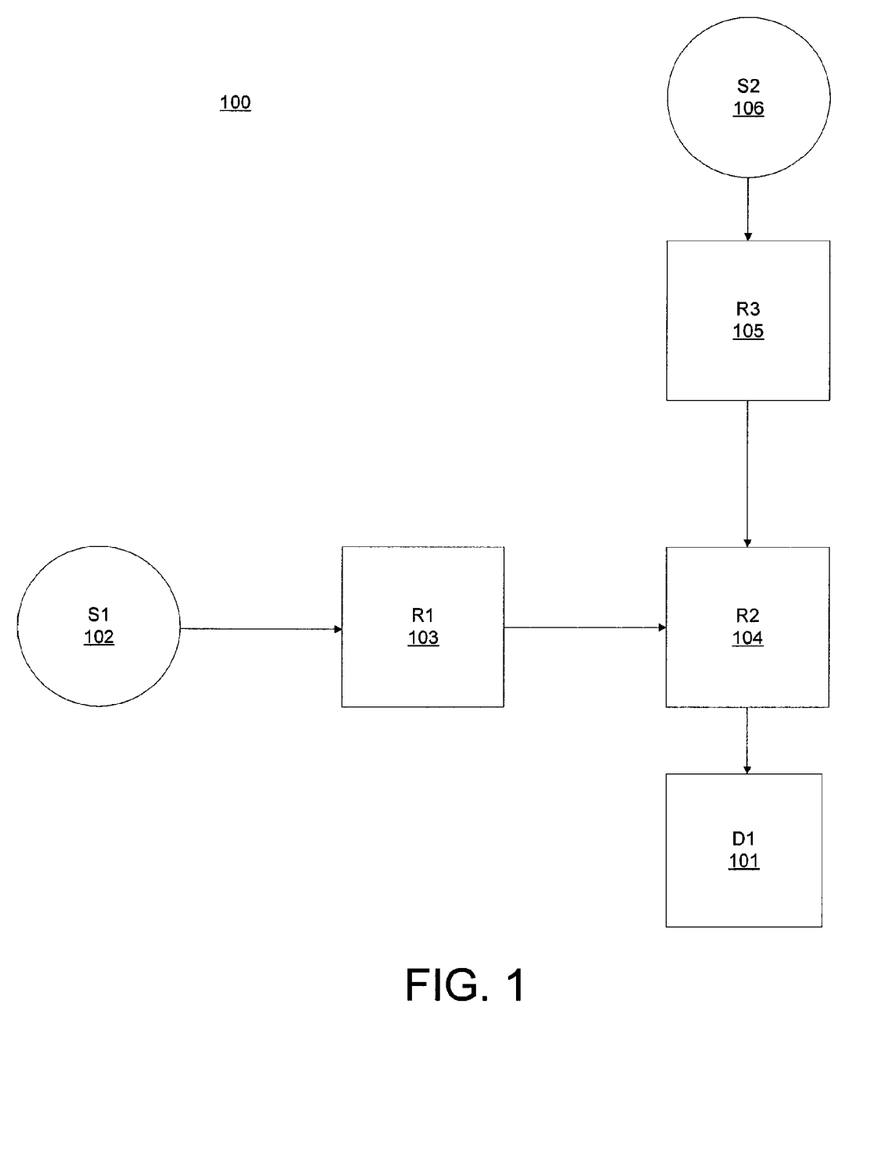
FIG. 1 illustrates a network topology that may be discovered using an embodiment of a method for determination of network topology using flow-based traffic information.

FIG. 1 shows an embodiment of a network topology 100 that may be discovered using flow-based traffic information. The topology is not known in advance. The path between a source and a destination via a sequence of routers may be denoted by p. For each source-destination pair, {R} denotes the set of network devices, which may include routers, switches, or any other type of network node, at which a particular source-destination pair is observed. {R} is the device set of path p. The following traffic flow records are obtained from the network topology of FIG. 1 by a traffic measurement utility: $s_1 \rightarrow d_1$ is observed at router $r_1$; $s_1 \rightarrow d_1$ is observed at router $r_2$; and $s_2 \rightarrow d_1$ is observed at router $r_2$. Therefore, destination di has two distinct source destination pairs: $s_1 \rightarrow d_1$ and $s_2 \rightarrow d_1$. Device set $\{r_1, r_2\}$ corresponds to $s_1 \rightarrow d_1$, and device set $\{r_2\}$ corresponds to $s_2 \rightarrow d_1$. If shortest path routing is used, device $r_1$ must be before device $r_2$ on the path to destination $d_1$, because for any destination d, if $\{R_1\}$ and $\{R_2\}$ are two device sets of destination d, the network devices contained in both sets $\{R_1\}$ and $\{R_2\}$ (i.e., $\{R_1\} \cap \{R_2\}$) are closer to destination d than any other devices in sets $R_1$ or $R_2$.

From the observed source-destination pairs, the following end-to-end paths are possible: for $s_1 \rightarrow d_1$, path $p_1$: $s_1 \rightarrow r_1 \rightarrow r_2 \rightarrow d_1$, or path $p_2$: $s_1 \rightarrow r_2 \rightarrow r_1 \rightarrow d_1$; and for $s_2 \rightarrow d_1$, path $p_3$: $s_2 \rightarrow r_2 \rightarrow d_1$. The combination of paths $p_2$ and $p_3$ lead to a conflict under the assumption of destination routing with static single routes because $s_2 \rightarrow d_1$ is not observed at $r_1$. Therefore, a conflict-free routing topology tree constructed from the observed data set for $d_1$ is shown in FIG. 1, combining $p_1$ and $p_3$. Source $s_1$ (102) communicates with $d_1$ (101) via routers $r_1$ (103) and $r_2$ (104), and source $s_2$ (106) communicates with $d_1$ (101) via router $r_2$ (104). Router $r_3$ (105) cannot be detected from the data, as no traffic measurements are given for router $r_3$ (105).

Figure 2:
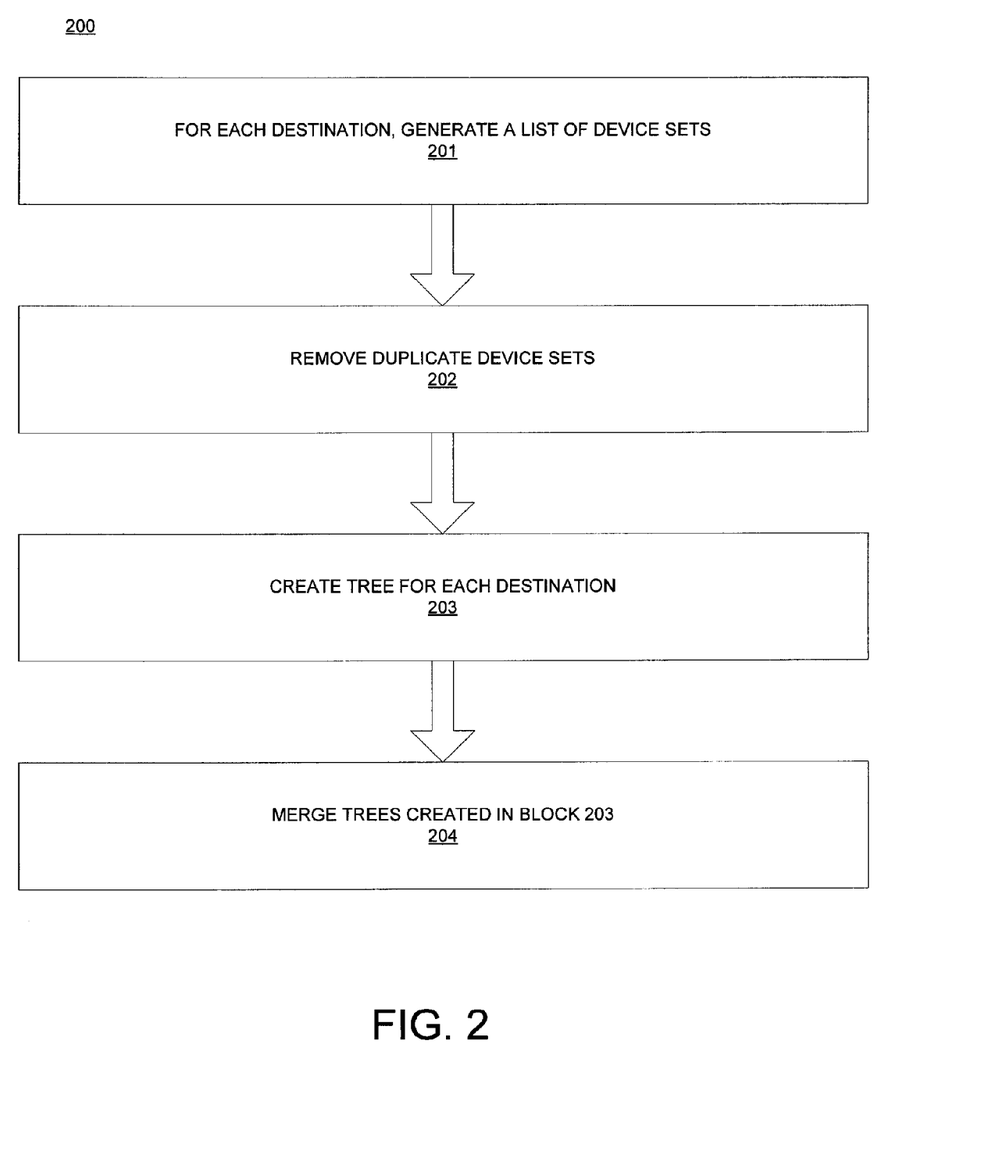
FIG. 2 illustrates an embodiment of a method for determination of network topology using flow-based traffic information.

FIG. 2 shows an embodiment of a method 200 for topology discovery using traffic records. Referring to FIG. 2, in block 201, a list of device sets for each destination is determined from the traffic records obtained regarding each destination. In block 202, any duplicate device sets are removed from each list. A tree $G_d$ is created in block 203 for each destination; tree creation is discussed in further detail below with regard to FIG. 3. In the created trees $G_d$, each node represents a network device or set of network devices. In block 204, the trees $G_d$ created for each destination are merged. Merging two or more trees might not be possible if intersecting but non-identical node identifiers exist. For example, if a tree has a node with an identifier $\{r_2,r_3,r_4\}$ and a second tree has a node with an identifier $\{r_2, r_3\}$, then it might not be possible to unambiguously merge the trees. In this case, the topological information is included in the individual trees. If all non-identical node identifiers have empty intersections, then a merged graph consists of the union of nodes and links in the trees.

Figure 3:
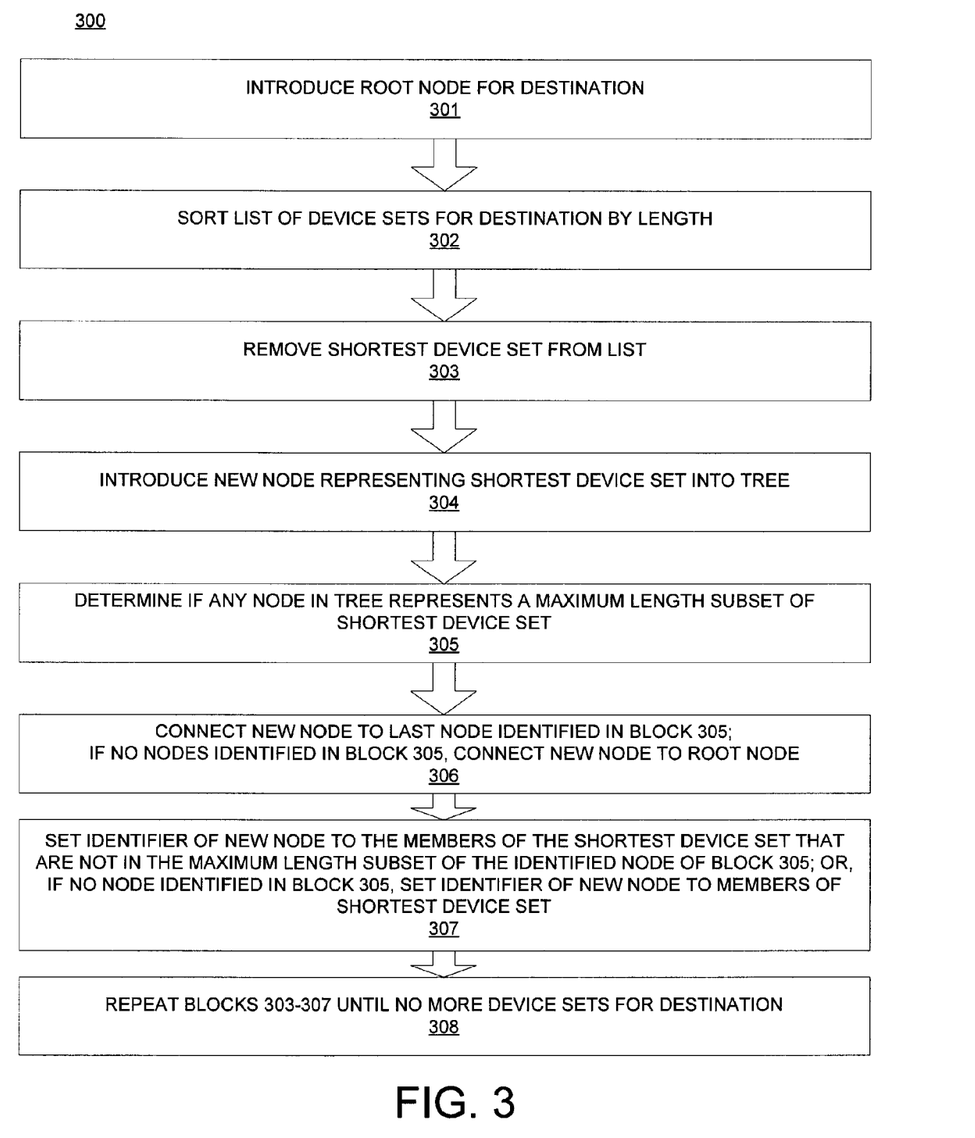
FIG. 3 illustrates an embodiment of a method for tree creation.

FIG. 3 shows an embodiment of a method 300 for tree creation. In block 301, a root node is introduced representing destination d. In block 302, the list of device sets for destination d is sorted by length, i.e., by the number of devices contained in each device set. In block 303, the shortest device set $\{R_i\}$ is removed from the list. In block 304, a new node is introduced in the tree. In block 305, it is determined if any node in the tree represents a maximum length subset of the shortest device set. In block 306, the new node from block 304 is connected to the node determined in block 305; if no node is determined in block 305, the new node is connected to the root node. In block 307, the identifier of the new node is set to the members of the shortest device set that are not present in the maximum length subset of any node determined in block 305, or, f no node was determined in block 305, the identifier of the new node is set to the members of the shortest device set. In block 308, blocks 303-307 are repeated for the next shortest device set in the list, until there are no more device sets remaining for the destination. The resulting graph is the topology tree for the destination.

Figure 4:
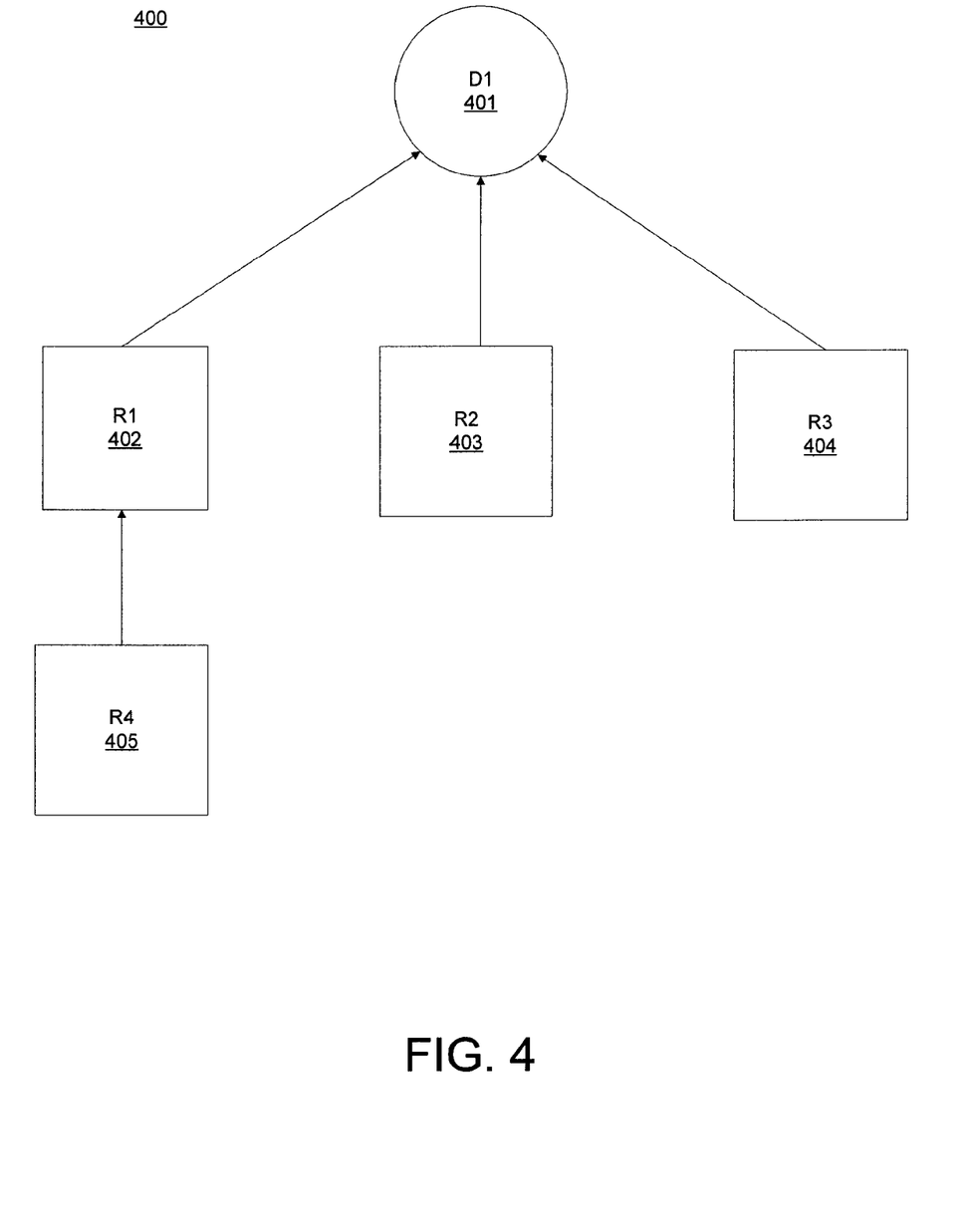
FIG. 4 illustrates a tree that may be created using an embodiment of a method for tree creation.
Figure 5:
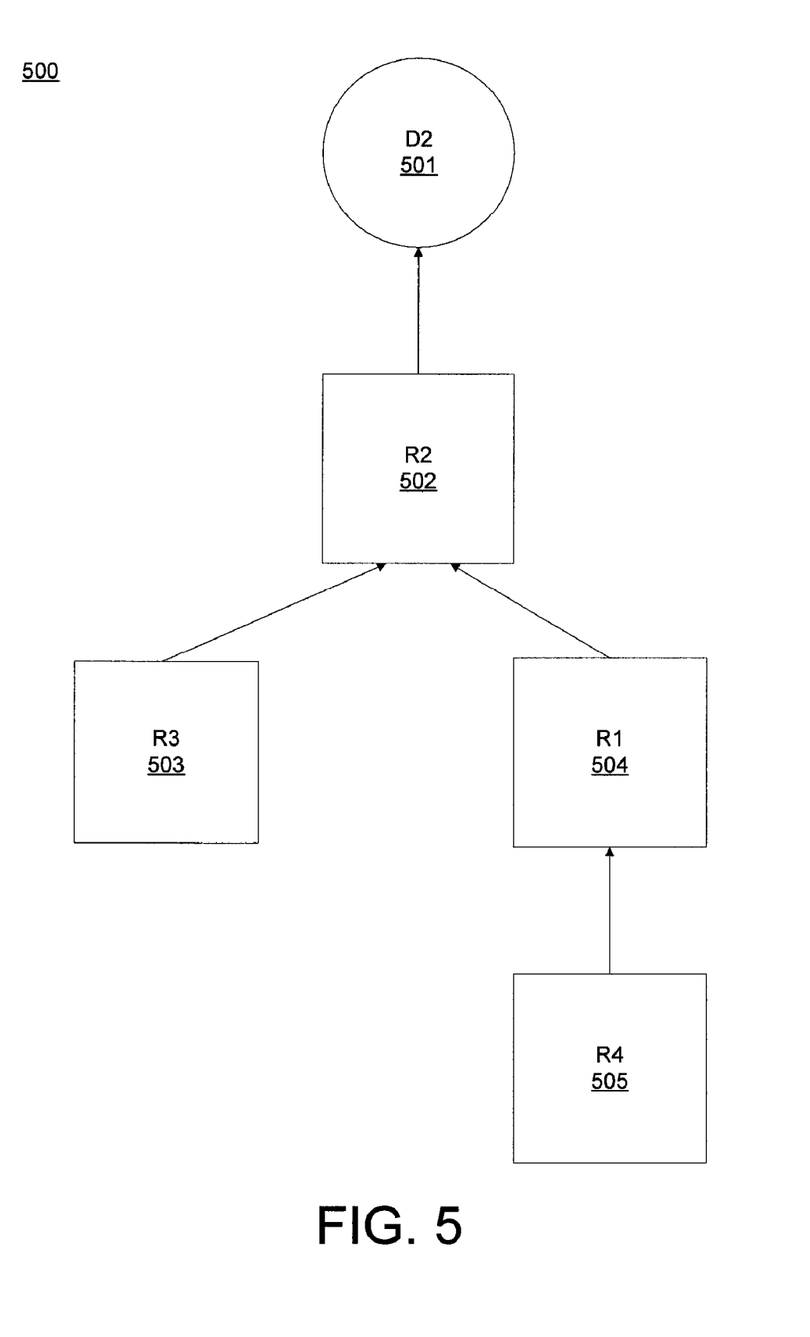
FIG. 5 illustrates a tree that may be created using an embodiment of a method for tree creation.

In an example, the following lists of device sets are generated for destinations $d_1$ and $d_2$ in block 201 of FIG. 2: device sets $\{r_1\}$, $\{r_2\}$, $\{r_3\}$ and $\{r_4, r_1\}$ for destination $d_1$; and device sets $\{r_2\}$, $\{r_1, r_2\}$, $\{r_3, r_2\}$, and $\{r_4, r_1, r_2\}$ for destination $d_2$. These generated lists of device sets contain no duplicate device sets, as required by FIG. 2, block 202. In block 203, performing the tree-creation method of FIG. 3 on the above data yields tree 400 for $d_1$ as shown in FIG. 4, and tree 500 for $d_2$ as shown in FIG. 5. Execution of the method of FIG. 3 on the above data is discussed in detail below.

Generation of the tree shown in FIG. 4 for $d_1$ using the method of FIG. 3 is as follows. In block 301, a root node 401 for destination di is introduced. Next, in block 302, the list of device sets for $d_1$ is sorted by length, yielding $\{r_1\}$, $\{r_2\}$, $\{r_3\}$, and $\{r_4, r_1\}$. In block 303, $\{r_1\}$ is removed from the list of device sets. A node 402 is introduced into the tree in block 304. In block 305, it is determined that there is no node in the tree representing a maximum length subset of the shortest device set $\{r_1\}$, so in block 306, node 402 is connected to root node 401. The identifier of node 402 is set to $r_1$ in block 307. In block 308, blocks 303-307 are repeated for $\{r_2\}$, then for $\{r_3\}$, and lastly for $\{r_4, r_1\}$.

For $\{r_2\}$, in block 303, $\{r_2\}$ is removed from the list. In block 304, node 403 is introduced into the tree. In block 305, it is determined that there is no node in the tree representing a maximum length subset of the shortest device set $\{r_2\}$, so in block 306, node 403 is connected to root node 401. The identifier of node 403 is set to $r_2$ in block 307. For $\{r_3\}$, in block 303, $\{r_3\}$ is removed from the list. In block 304, node 404 is introduced into the tree. In block 305, it is determined that there is no node in the tree representing a maximum length subset of the shortest device set $\{r_3\}$, so in block 306, node 404 is connected to root node 401. The identifier of node 404 is set to $r_3$ in block 307. Lastly, for $\{r_4, r_1\}$, in block 303, $\{r_4, r_1\}$ is removed from the list. In block 304, node 405 is introduced into the tree. In block 305, it is determined that node 402 represents $\{r_1\}$, which is the maximum length subset of the shortest device set $\{r_4, r_1\}$, so in block 306, node 403 is connected to node 402. The identifier of node 405 is set to $r_4$ in block 307, as $r_4$ is not in $\{r_1\}$ (node 402). At this point, there are no more device sets for destination $d_1$, and the end result is the tree 400 shown in FIG. 4.

Generation of the tree shown in FIG. 5 for $d_2$ using the method of FIG. 3 is as follows. Starting at block 301, a root node 501 for destination $d_2$ is introduced. Next, in block 302, the list of device sets for $d_1$ is sorted by length, yielding $\{r_2\}$, $\{r_1, r_2\}$, $\{r_3, r_2\}$, and $\{r_4, r_1, r_2\}$. In block 303, $\{r_2\}$ is removed from the list of device sets. A node 502 is introduced into the tree in block 304. In block 305, it is determined that there is no node in the tree representing a maximum length subset of the shortest device set $\{r_2\}$, so in block 306, node 502 is connected to root node 501. The identifier of node 502 is set to $r_2$ in block 307. In block 308, blocks 303-307 are repeated for $\{r_1, r_2\}$, $\{r_3, r_2\}$, and $\{r_4, r_1, r_2\}$.

For $\{r_1, r_2\}$, in block 303, $\{r_1, r_2\}$ is removed from the list. In block 304, node 504 is introduced into the tree. In block 305, it is determined that node 502 represents $\{r_2\}$, which is the maximum length subset of the shortest device set $\{r_1, r_2\}$, so in block 306, node 504 is connected to node 502. The identifier of node 504 is set to $r_1$ in block 307, as $r_1$ is not in $\{r_2\}$ (node 502). For $\{r_3, r_2\}$, in block 303, $\{r_3, r_2\}$ is removed from the list. In block 304, node 503 is introduced into the tree. In block 305, it is determined that node 502 represents $\{r_2\}$, which is the maximum length subset of the shortest device set $\{r_3, r_2\}$, so in block 306, node 503 is connected to node 502. The identifier of node 503 is set to $r_3$ in block 307, as $r_3$ is not in $\{r_2\}$ (node 502). For $\{r_4, r_1, r_2\}$, in block 303, $\{r_4, r_1, r_2\}$ is removed from the list. In block 304, node 505 is introduced into the tree. In block 305, it is determined that node 504 represents $\{r_2, r_1\}$, which is the maximum length subset of the shortest device set $\{r_4, r_1, r_2\}$, so in block 306, node 505 is connected to node 504. The identifier of node 503 is set to $r_4$ in block 307, as $r_4$ is not in $\{r_2, r_1\}$ (nodes 502 and 504). At this point, there are no more device sets for destination $d_2$, and the end result is the tree 500 shown in FIG. 5.

Figure 6:
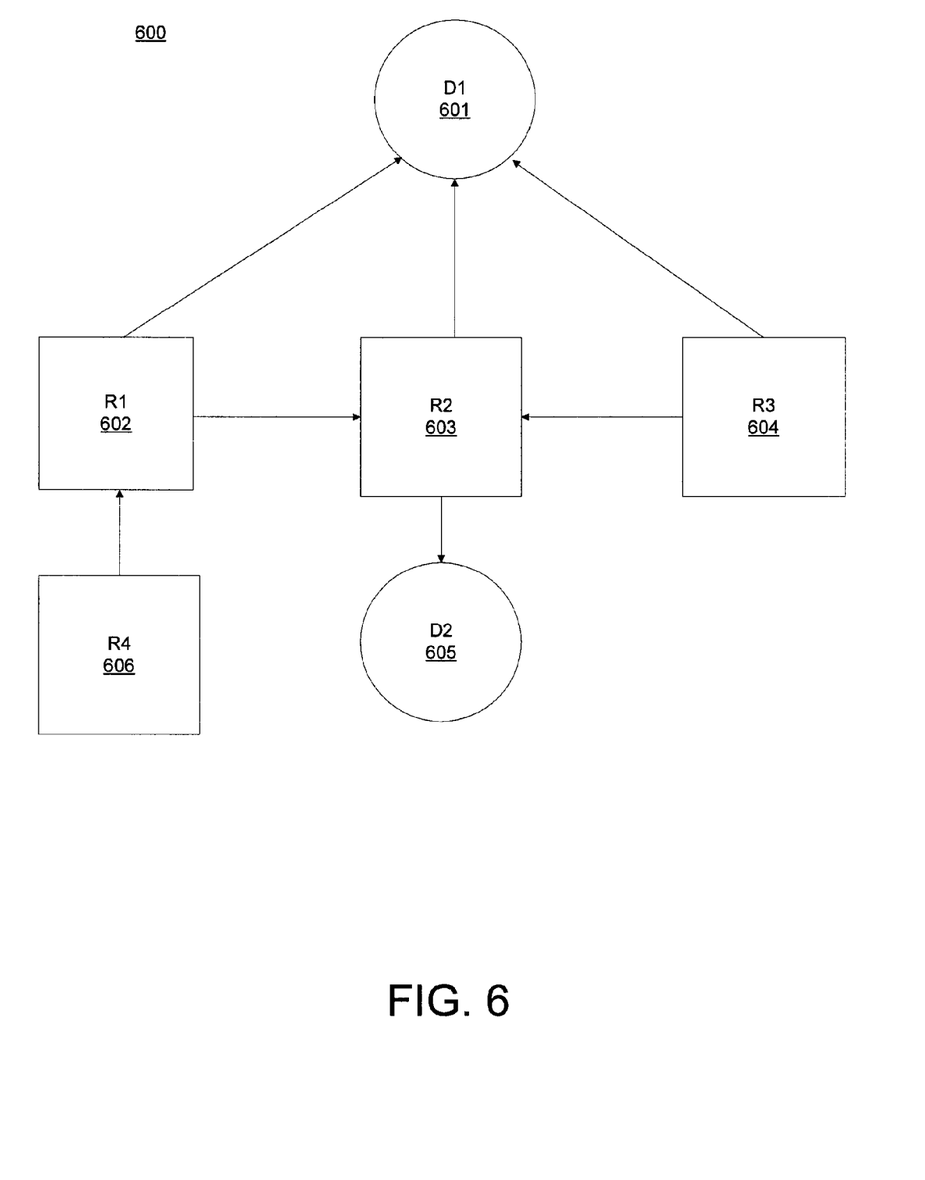
FIG. 6 illustrates a topology that may be discovered using an embodiment of a method for determination of network topology using flow-based traffic information.

Once trees 400 and 500 are obtained for destinations $d_1$ and $d_2$ in block 203 of FIG. 2, trees 400 and 500 are merged in block 204 to yield the overall topology 600 of the network that includes destinations $d_1$ and $d_2$ as shown in FIG. 6. The merged graph consists of the union of the various nodes and links present in trees 400 and 500.

Figure 7:
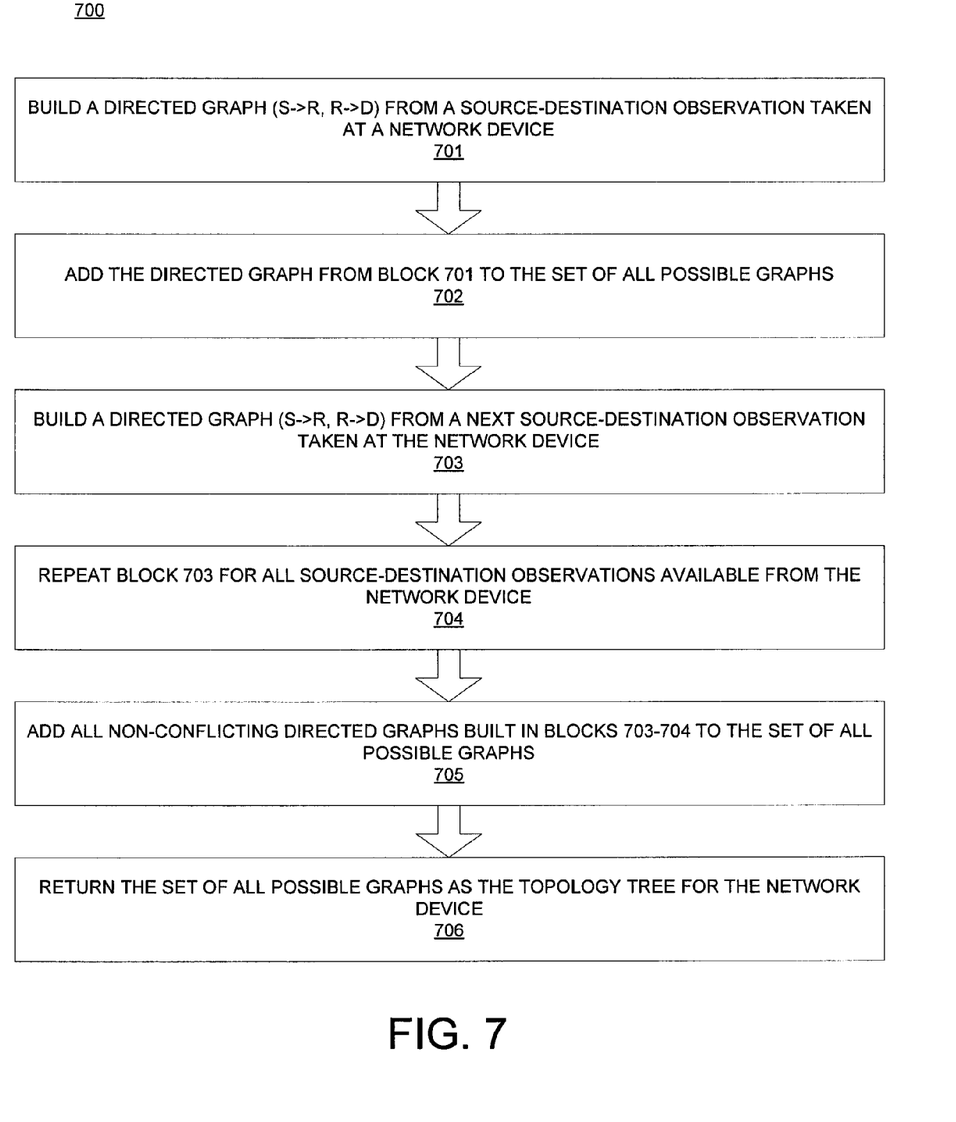
FIG. 7 illustrates an embodiment of a method for tree building for a router from a list of source-destination observations taken at the router.

FIG. 7 shows an embodiment of a method 700 for tree building for a network device from a list of source-destination observations taken at the network device, which may be used in conjunction with the methods of FIGS. 2 and 3. In block 701, a first source-destination observation ($s_1 \rightarrow d_1$) provided from the network device r is used to build a directed graph $g = \{s_1 \rightarrow r, r \rightarrow d_1\}$. In block 702, graph $g_1$ is added to the set of all possible graphs G. In block 703, a directed graph $g_n$ is built for a next source-destination observation ($s_n \rightarrow d_n$) provided from network device r. In block 704, repeat block 703 until no more source-destination observations are available from the network device r. In block 705, for all g in G: If g can be inserted without conflict into G. i.e., there is no violation of the assumption of destination routing with static routes, then insert g into G; if there is a conflict, g is not added to G. In block 706, return G as the topology tree for network device r. Method 700 may be performed for all network devices for which data is available. A topology tree generated by method 700 may be merged with other topology trees generated for a network using the methods of FIG. 3 or FIG. 7 to determine the overall topology of the network.

Figure 8:
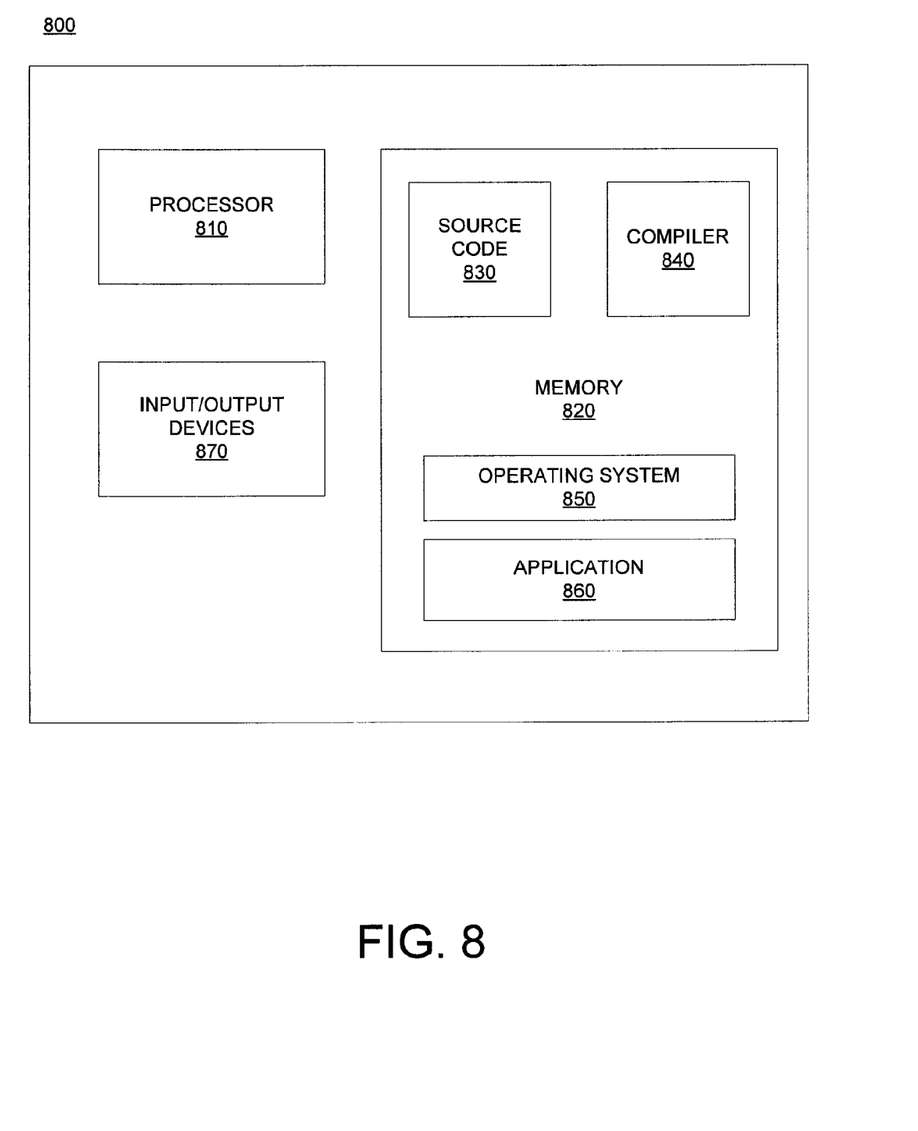
FIG. 8 illustrates a computer that may be used in conjunction with an embodiment of a method for determination of network topology using flow-based traffic information.

FIG. 8 illustrates an example of a computer 800 having capabilities, which may be utilized by exemplary embodiments of a method for determination of network topology using flow-based traffic information as embodied in software. Various operations discussed above may utilize the capabilities of the computer 800. One or more of the capabilities of the computer 800 may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more input and/or output (I/O) devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a macroprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 860 is implemented in hardware, the application 860 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include determination of topology using information available from traffic measurements, without the need for credentials or other network configuration information.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determination of a network topology from a set of traffic records, the method comprising:

generating, by a computer processor, a list of device sets for a destination from the set of traffic records, each device set comprising at least one network device;

removing any duplicate device sets from the list of device sets;

creating a tree for the destination using the list of device sets, wherein creating a tree comprises:

introducing a root node into the tree;

sorting the list of device sets for the destination by length;

removing the shortest device set from the list;

introducing a new node representing the shortest device set into the tree; determining whether a node in the tree represents a maximum length subset of the shortest device set, and in the event that a node is determined, connecting the new node to the determined node, or else connecting the new node to the root node;

setting the identifier of the introduced node to a list of members of the shortest device set that are not represented in the determined node, or, in the event that the new node is connected to the root node, to a list of members of the shortest device set; and repeating the removing the shortest device set, introducing, determining, and setting for the next shortest device set in the list, until there are no more device sets remaining for the destination.

2. The method of claim 1, further comprising assuming shortest-path destination routing and static routes to the destination during a time interval during which the traffic records are collected.

3. The method of claim 1, further comprising repeating the method of claim 1 for a plurality of destinations.

4. The method of claim 3, further comprising merging the trees created for the plurality of destinations to determine an overall network topology.

5. The method of claim 4, further comprising:

obtaining a list of source-destination observations from a network device;

building a first directed graph using a first source-destination observation from the list;

adding the first directed graph to a set of all possible graphs for the router;

building a directed graph for each subsequent source-destination observation in the list;

sequentially inserting the built directed graphs into the set of all possible graphs in the event there is no conflict between the directed graph being inserted and the set of all possible graphs;

returning the set of all possible graphs as a topology tree for the network device; and merging the topology tree for the network device with the overall network topology.

6. The method of claim 1, wherein the set of traffic records are provided by an end-to-end flow-based traffic measurement utility.

7. The method of claim 1, wherein a traffic record comprises a source address, a destination address, and an identification of a measurement point.

8. The method of claim 7, wherein a traffic record further comprises interface information, timing information, and an actual load of a path.

9. A computer program product comprising a non-transitory computer readable storage medium containing computer code that, when executed by a computer, implements a method for determination of a network topology, wherein the method comprises:
  generating a list of device sets for a destination from the set of traffic records, each device set comprising at least one network device;
  removing any duplicate device sets from the list of device sets;
  creating a tree for the destination using the list of device sets, wherein creating a tree comprises:
  introducing a root node into the tree;
  sorting the list of device sets for the destination by length;
  removing the shortest device set from the list;
  introducing a new node representing the shortest device set into the tree;
  determining whether a node in the tree represents a maximum length subset of the shortest path, and in the event that a node is determined, connecting the new node to the determined node, or else connecting the new node to the root node;
  setting the identifier of the introduced node to a list of members of the shortest device set that are not represented in the determined node, or, in the event that the new node is connected to the root node, to a list of members of the shortest device set; and
  repeating the removing the shortest device set, introducing, determining, and setting for the next shortest device set in the list, until there are no more device sets remaining for the destination.

10. The computer program product of claim 9, further comprising assuming shortest-path destination routing and static routes to the destination during a time interval during which the traffic records are collected.

11. The computer program product of claim 9, further comprising repeating the method of claim 9 for a plurality of destinations.

12. The computer program product of claim 11, further comprising merging the trees created for the plurality of destinations to determine an overall network topology.

13. The computer program product of claim 12, further comprising:
  obtaining a list of source-destination observations from a network device;
  building a first directed graph using a first source-destination observation from the list;
  adding the first directed graph to a set of all possible graphs for the network device;
  building a directed graph for each subsequent source-destination observation in the list;
  sequentially inserting the built directed graphs into the set of all possible graphs in the event there is no conflict between the directed graph being inserted and the set of all possible graphs;
  returning the set of all possible graphs as a topology tree for the network device; and
  merging the topology tree for the network device with the overall network topology.

14. The computer program product of claim 9, wherein the set of traffic records are provided by an end-to-end flow-based traffic measurement utility.

15. The computer program product of claim 9, wherein a traffic record comprises a source address, a destination address, and an identification of a measurement point.

16. The computer program product of claim 9, wherein a traffic record further comprises interface information, timing information, and an actual load of a path.

17. A network comprising:
  means for generating a list of device sets for a destination from a set of traffic records, each device set comprising at least one network device;
  means for removing any duplicate device sets from the list of device sets;
  means for creating a tree for the destination using the list of device sets, wherein creating a tree comprises:
  means for introducing a root node into the tree;
  means for sorting the list of device sets for the destination by length;
  means for removing the shortest device set from the list;
  means for introducing a new node representing the shortest device set into the tree;
  means for determining whether a node in the tree represents a maximum length subset of the shortest path, and in the event that a node is determined, connecting the new node to the determined node, or else connecting the new node to the root node;
  means for setting the identifier of the introduced node to a list of members of the shortest device set that are not represented in the determined node, or, in the event that the new node is connected to the root node, to a list of members of the shortest device set; and
  means for repeating the removing the shortest device set, introducing, determining, and setting for the next shortest device set in the list, until there are no more device sets remaining for the destination.

18. The network of claim 17, further comprising means for assuming shortest-path destination routing and static routes to the destination during a time interval during which the traffic records are collected.

19. The network of claim 17, further comprising means for creating a tree using a plurality of lists of device sets for a respective plurality of destinations.

20. The network of claim 19, further comprising means for merging the trees created for the plurality of destinations to determine an overall network topology.

* * * * *